US008150410B2

(12) United States Patent
Khan

(10) Patent No.: US 8,150,410 B2
(45) Date of Patent: Apr. 3, 2012

(54) SYSTEM AND METHOD FOR A FRACTIONAL LOADING SCHEME FOR BROADCAST/MULTICAST TRAFFIC

(75) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 11/651,689

(22) Filed: Jan. 10, 2007

(65) Prior Publication Data

US 2007/0293229 A1 Dec. 20, 2007

Related U.S. Application Data

(60) Provisional application No. 60/814,167, filed on Jun. 16, 2006.

(51) Int. Cl.
*H04W 72/00* (2009.01)
(52) U.S. Cl. ........................ 455/452.2; 455/450; 370/486
(58) Field of Classification Search .................. 455/450, 455/464, 509, 452.1, 452.2; 370/329, 341, 370/433
See application file for complete search history.

(56) References Cited

U.S. PATENT DOCUMENTS

| | | | | |
|---|---|---|---|---|
| 5,581,548 A * | 12/1996 | Ugland et al. | ................ | 370/330 |
| 5,946,625 A * | 8/1999 | Hassan et al. | ................ | 455/447 |
| 6,647,000 B1 * | 11/2003 | Persson et al. | ................ | 370/330 |
| 6,671,309 B1 * | 12/2003 | Craig et al. | ................ | 375/132 |
| 6,757,542 B2 * | 6/2004 | Bruin et al. | ................ | 455/452.1 |
| 6,885,651 B1 | 4/2005 | Young | | |
| 6,965,582 B1 * | 11/2005 | Moulsley | ................ | 370/329 |
| 6,985,700 B1 * | 1/2006 | Laakso et al. | ................ | 455/63.1 |
| 7,474,895 B1 * | 1/2009 | Jiang et al. | ................ | 455/447 |
| 2001/0008523 A1 * | 7/2001 | Song | ................ | 370/335 |
| 2003/0153346 A1 * | 8/2003 | Kim et al. | ................ | 455/522 |
| 2004/0029573 A1 * | 2/2004 | Kim | ................ | 455/415 |
| 2004/0038682 A1 * | 2/2004 | Persson et al. | ................ | 455/436 |
| 2004/0219912 A1 * | 11/2004 | Johansson et al. | ................ | 455/424 |
| 2005/0032542 A1 * | 2/2005 | Wilborn et al. | ................ | 455/525 |
| 2005/0078654 A1 * | 4/2005 | Rick et al. | ................ | 370/350 |
| 2007/0055990 A1 * | 3/2007 | Seppala | ................ | 725/39 |
| 2007/0165584 A1 * | 7/2007 | Ponnampalam et al. | ..... | 370/338 |
| 2007/0249340 A1 * | 10/2007 | Hiltunen et al. | ................ | 455/433 |

FOREIGN PATENT DOCUMENTS

| | | |
|---|---|---|
| GB | 2 401 753 A | 11/2004 |
| GB | 2419494 A * | 4/2006 |
| WO | WO 2005/018107 A1 | 2/2005 |

OTHER PUBLICATIONS

Andrews, M.; Khanna, S.; Kumaran, K.; "Integrated scheduling of unicast and multicast traffic in an input-queued switch;" INFOCOM '99. Eighteenth Annual Joint Conference of the IEEE Computer and Communications Societies. Proceedings. IEEE; pp. 1144-1151 vol. 3; Mar. 21-25, 1999; New York, NY.*
European Search Report dated Jan. 23, 2012 in connection with European Patent Application No. 07 01 1561.

* cited by examiner

*Primary Examiner* — Kent Chang
*Assistant Examiner* — Kashif Siddiqui

(57) ABSTRACT

The present disclosure relates generally to systems and methods for a fractional loading scheme for broadcast/multicast traffic. In one example, the method includes determining a fractional loading factor for a portion of a wireless network and selecting wireless network resources from a resource pool allocated to single-cell broadcast traffic based on the fractional loading factor. Single-cell broadcast traffic is then transmitted using the wireless network resources.

24 Claims, 6 Drawing Sheets

SYSTEM AND METHOD FOR A FRACTIONAL LOADING SCHEME FOR BROADCAST/MULTICAST TRAFFIC

CLAIM OF PRIORITY

This application claims priority from U.S. Provisional Patent Application Ser. No. 60/814,167, filed on Jun. 16, 2006, and entitled "A FRACTIONAL LOADING SCHEME FOR BROADCAST/MULTICAST TRAFFIC", which is incorporated by reference herein in its entirety.

BACKGROUND

In a wireless system, an access point (e.g., a base station) may transmit broadcast/multicast traffic. Such traffic is generally transmitted to multiple mobile terminals within the broadcast area, rather than to a specific mobile terminal. Traditionally, such broadcast/multicast traffic is transmitted using most or all resources of a cell, which results in increased interference from neighboring cells. This interference may degrade the wireless system's performance and throughput. To reduce such interference, frequency allocation may be used at the network level. However, such frequency allocation is a time consuming task and, once allocated, it may be difficult to adjust the frequencies to respond to changes within the system. Accordingly, improvements in transmitting and receiving broadcast/multicast traffic are needed.

SUMMARY

In one embodiment, a method comprises determining, by a base station, a duty cycle for transmitting single-cell broadcast traffic in a wireless network, wherein the duty cycle is less than one hundred percent of the base station's available bandwidth. A percentage of resources is selected from a resource pool allocated to single-cell broadcast traffic, wherein the percentage of resources is substantially equal to the duty cycle, and single-cell broadcast traffic is transmitted using the resources.

In another embodiment, a method comprises determining a fractional loading factor for a portion of a wireless network and randomly selecting wireless network resources from a resource pool allocated to single-cell broadcast traffic based on the fractional loading factor. At least one mobile terminal is informed of the wireless network resources selected for use for single-cell broadcast, and single-cell broadcast traffic is transmitted using the wireless network resources.

In yet another embodiment, a method comprises receiving and decoding, by a wireless receiver, information about single-cell broadcast resources used for fractional loading transmissions in a cell of a wireless network by a base station. The method also includes receiving and decoding, by the wireless receiver, broadcast information transmitted by the base station using the single-cell broadcast resources.

In still another embodiment, a method comprises identifying, by a wireless receiver, information about single-cell broadcast resources used for fractional loading transmissions in a cell of a wireless network based on at least one of a cell identifier and a subframe identifier. The method also includes receiving and decoding, by the wireless receiver, broadcast information transmitted by a base station using the single-cell broadcast resources.

In another embodiment, a base station in a wireless network comprises a wireless interface for receiving and transmitting wireless signals, a processor coupled to the wireless interface, a memory coupled to the processor, and a plurality of executable instructions stored on the memory for execution by the processor. The instructions include instructions for determining a fractional loading factor for a cell in which the base station is positioned, selecting wireless network resources corresponding to the fractional loading factor from a resource pool allocated to single-cell broadcast traffic, and transmitting single-cell broadcast traffic using the wireless network resources.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
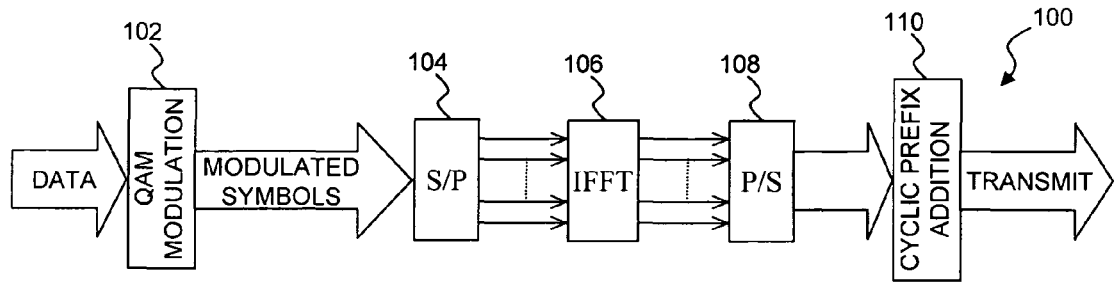
FIG. 1A is a diagram of one embodiment of a wireless transmitter with which the present invention may be used.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
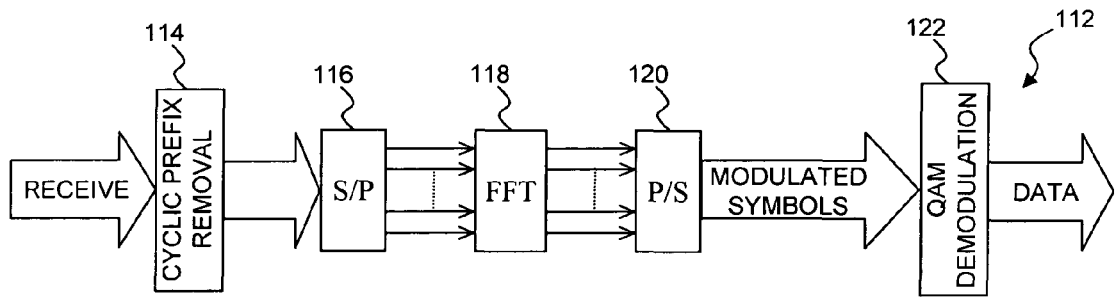
FIG. 1B is a diagram of one embodiment of a wireless receiver with which the present invention may be used.

Referring to FIGS. 1A and 1B, one embodiment of an Orthogonal Frequency Division Multiplexing (OFDM) based wireless communication system is provided. FIG. 1A illustrates a transmitter 100 for the OFDM based wireless communication system, while FIG. 1B illustrates a receiver 112 for the system. The transmitter 100 may be an access point (e.g., a base station) in a wireless network, and such networks may include wideband digital communication systems such as wireless local area networks (LANs) (e.g., IEEE 802.11a and 802.11g networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Flash-OFDM cellular systems, and Ultra wideband (UWB) systems. It is understood that OFDM is used as an example and that the present disclosure may be used with other wireless systems. For example, the present disclosure may be used with Global System for Mobile communications (GSM) and/or code division multiple access (CDMA) communications systems. The receiver 112 may be any wireless OFDM receiver and may be included in such mobile terminals as computers, cell phones, personal digital assistants (PDAs), pagers, portable game devices, and any other device capable of wireless communications.

With specific reference to the transmitter 100 of FIG. 1A, data to be transmitted is converted into modulated symbols via a Quadrature Amplitude Modulation (QAM) process in QAM modulation block 102. The modulated symbols are serial-to-parallel (S/P) converted in S/P block 104 and input to an inverse Fast Fourier Transform (IFFT) block 106. The IFFT block 106 outputs N time-domain samples, where N refers to the IFFT/FFT size used by the OFDM system. After processing by the IFFT block 106, the signal is parallel-to-serial (P/S) converted by P/S block 108 and a cyclic prefix (CP) is added to the signal sequence by CP addition block 110. The resulting sequence of samples is referred to as OFDM symbol and may be transmitted.

With specific reference to the receiver 112 of FIG. 1B, the cyclic prefix is first removed from a received OFDM symbol by CP removal block 114 and the signal is serial-to-parallel converted by S/P block 116. The signal is then fed into FFT block 118, and the output of the FFT block 118 is parallel-to-serial converted in P/S block 120. The resulting QAM modulation symbols are input to QAM demodulation block 122, which demodulates the symbols to recover the transmitted data.

The total bandwidth in an OFDM system, such as that of FIGS. 1A and 1B, is divided into narrowband frequency units called subcarriers. The number of subcarriers is equal to the FFT/IFFT size N used in the system. Generally, the number of subcarriers used for data is less than N because some subcarriers at the edge of the frequency spectrum are reserved as guard subcarriers, and usually no information is transmitted on guard subcarriers.

Figure 2A:
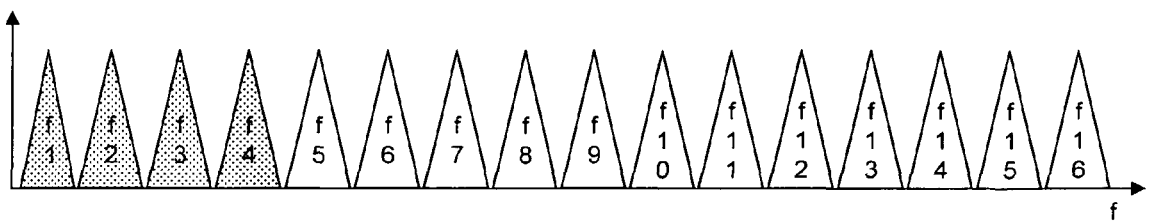
FIGS. 2A and 2B illustrate embodiments of contiguous and distributed frequency distributions, respectively, within a wireless system.
Figure 2B:
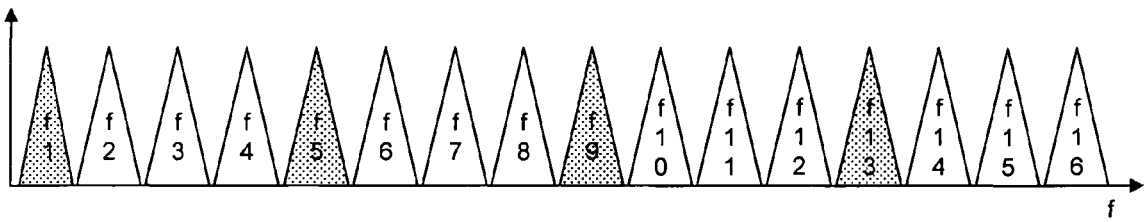

Referring to FIGS. 2A and 2B, in a communication link between a transmitter and a receiver (e.g., the transmitter 100 and receiver 112 of FIGS. 1A and 1B, respectively), multi-path channel interference may result in frequency-selective fading. Moreover, in a mobile wireless environment, the link may also experience time-varying fading due to the mobility of the mobile terminal. Therefore, in a wireless system employing OFDM based access, the overall system performance and efficiency may be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

As illustrated in FIG. 2A, in the case of frequency-selective multi-user scheduling, a contiguous set of subcarriers potentially experiencing an upfade may be allocated for transmission to a user. In the example of FIG. 2A, the total bandwidth (divided into subcarriers f1-f16) is divided into subbands grouping multiple contiguous subcarriers. For example, subcarriers f1, f2, f3 and f4 may be grouped into a subband and used for transmissions to a user in frequency-selective multi-user scheduling mode.

However, as illustrated in FIG. 2B, in the case of frequency-diversity transmissions, the allocated subcarriers are distributed over the whole spectrum f1-f16. For example, instead of the grouped contiguous subcarriers of FIG. 2A, uniformly distributed subcarriers f1, f5, f9, and f13 may be used.

Frequency-selective multi-user scheduling is generally beneficial for low mobility users for which the channel quality can be tracked. However, the channel quality can generally not be tracked for high mobility users due to channel quality feedback delays, particularly in a frequency-division-duplex system where the fading between the downlink (i.e., the link from the base station to the mobile terminal) and uplink (i.e., the link from the mobile terminal to the base station) is independent. Accordingly, for such users, frequency diversity transmission mode is generally preferred.

Figure 3:
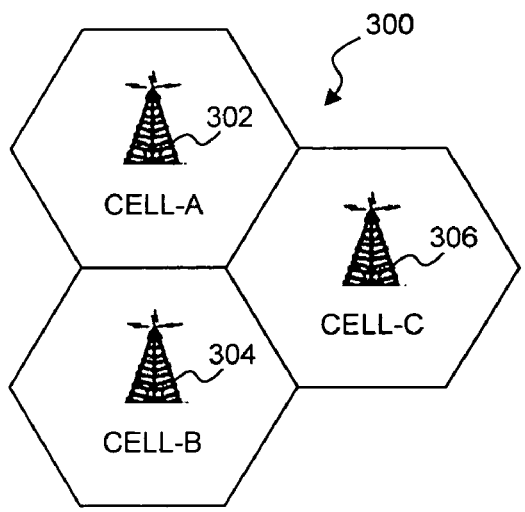
FIG. 3 illustrates one embodiment of a multi-cell wireless system.

Referring to FIG. 3, one embodiment of a wireless system 300 containing Cell-A, Cell-B, and Cell-C is illustrated. Cell-A, Cell-B, and Cell-C include base stations 302, 304, and 306, respectively. Although not shown, it is understood that each base station 302, 304, and 306 may include components for receiving, processing, and transmitting information. Such components may include one or more processors, memory, a wireless interface having wireless transmission and reception circuitry, and executable instructions stored on the memory for execution by the processor. Some or all of the components may be contained within the base station or distributed.

Each of Cell-A, Cell-B, and Cell-C may include one or more logical resource units. A logical resource unit may be defined either as a group of contiguous subcarriers (e.g., f1-f4 of FIG. 2A) or a group of distributed subcarriers (e.g., f1, f5, f9, and f13 of FIG. 2B). A resource set may be defined as a set containing one or more resource units. In a conventional frequency reuse approach, a resource set may be allocated to a cell on a fixed basis. For example, Cell-A may be allocated a resource set A, Cell-B may be allocated a resource set B, and Cell-C may be allocated a resource set C. In the example of FIG. 3, the three neighboring cells Cell-A, Cell-B and Cell-C may be allocated orthogonal frequency resources.

Figure 4:
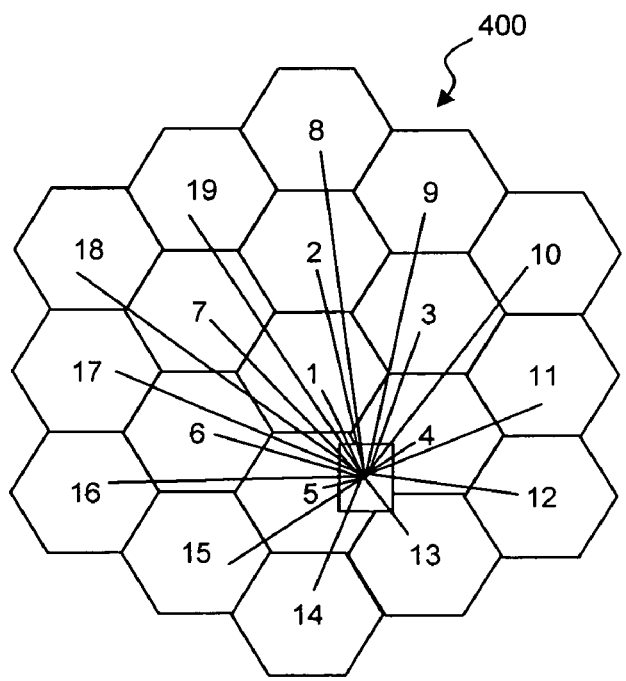
FIG. 4 illustrates one embodiment of a single-frequency network broadcast system.

Referring to FIG. 4, one embodiment of cells in a broadcast zone 400 is illustrated. In a broadcast transmission over a single frequency network (SFN), the same information content is transmitted simultaneously from all the cells in the system or from a subset of the cells. In the case of a broadcast transmission from a subset of the cells, the cells transmitting the same content generally belong to a broadcast zone. For example, as illustrated in FIG. 4, all cells 1-19 belong to the broadcast zone 400 and transmit the same information content. Therefore, a receiver listening to the broadcast content can potentially receive the signal from all the cells in the broadcast zone 400. If all the cells in the broadcast zone 400 are synchronized and OFDM is used for transmission, an SFN operation can be realized. In an SFN-based broadcast system, the signal from all the cells in the broadcast zone 400 can be collected at the receiver without any interference apart from the background noise plus any interference from cells not belonging to the broadcast zone. Therefore, signal-to-interference-plus-noise ratio (SINR) of the received broadcast signal can be improved. This generally allows for better recovery of the broadcast information.

Figure 5A:
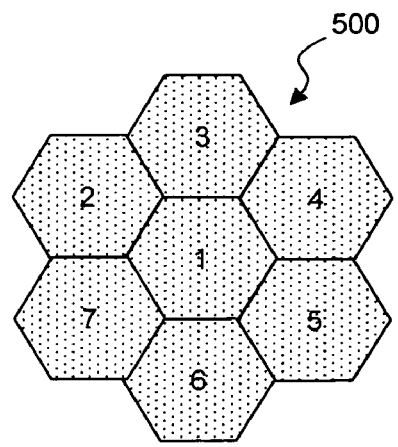
FIGS. 5A and 5B illustrate a multi-cell single frequency network broadcast system and a single-cell broadcast system, respectively.
Figure 5B:
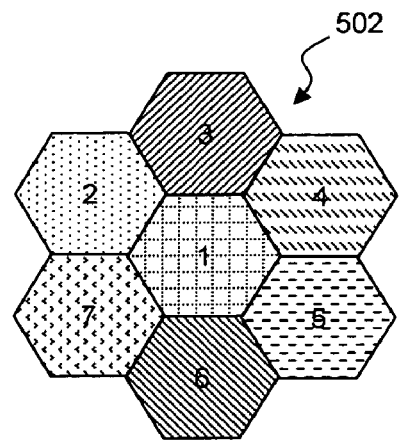

Referring to FIGS. 5A and 5B, embodiments of a multi-cell SFN broadcast (FIG. 5A) and a single cell broadcast (FIG. 5B) are illustrated. As illustrated in FIG. 5A, an SFN based broadcast may be viewed as a multi-cell broadcast because the same content is transmitted from multiple cells 1-7 within system 500. In contrast, in a single-cell broadcast as illustrated in FIG. 5B, different content may be transmitted from different cells 1-7 at different geographical locations within system 502. In the case of a multi-cell broadcast, the signal at the receiver can be combined from all the cells transmitting the same content. However, in a single-cell broadcast, a cell targets a broadcast transmission to users in its geographical area. Therefore, in a single-cell broadcast, the signals produced by different cells that are transmitting different content may interfere at the receiver.

Figure 6A:
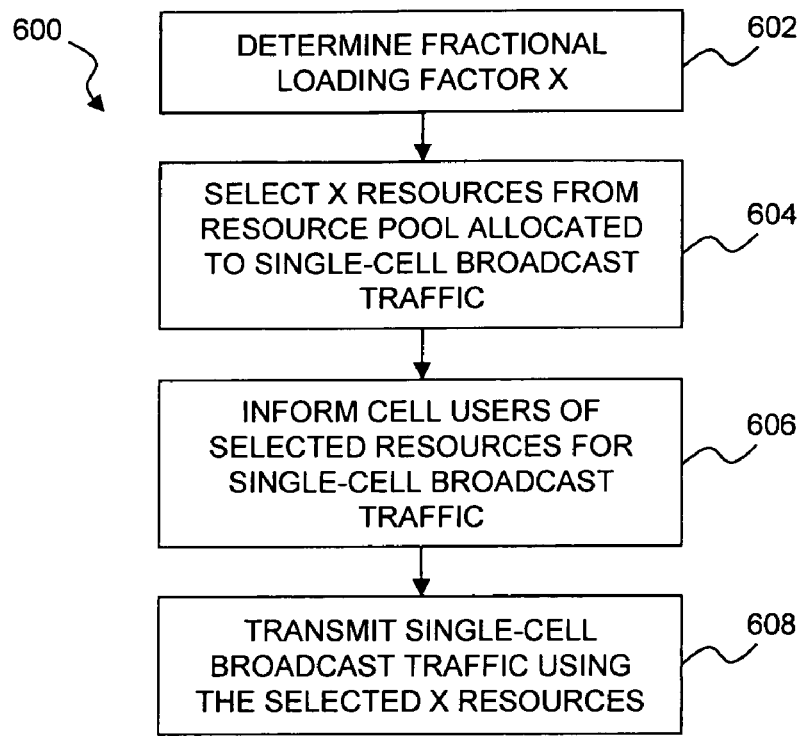
FIG. 6A is a flowchart illustrating one embodiment of a fractional loading method for use by a transmitter.

Referring to FIG. 6A, in one embodiment, a method 600 may use a fractional loading approach to improve the performance of single-cell broadcasts by reducing interference from neighboring cells. In a single-cell broadcast/multicast scenario, the performance of single-cell broadcasts may be determined by users operating near the edge of a cell because such users are generally the weakest users due to increased interference from neighboring cells. The method 600 may be used to reduce inter-cell interference for the cell edge users and may also be applied to other traffic types or control signaling that require uniform coverage across users within a cell. In the present example, the method 600 is executed by an access point in a wireless network, such as a base station. Each base station may execute the method 600 independently or the execution may be coordinated among the base stations.

In step 602, a fractional loading factor X is determined. The fractional loading factor X corresponds to a duty cycle to be used by the base station for single-cell broadcast/multicast transmissions. In the present example, the fractional loading factor X may be selected to maintain a balance between a loss in capacity due to the reduced bandwidth of fractional loading (e.g., from not using all of the available bandwidth) and an increase in capacity due to less interference. Other factors, such as the desire to minimize collisions with other base stations, may also be applied. For purposes of illustration, the fractional loading factor selected by the method 600 is approximately sixty percent, but it is understood that this may vary depending on the particular configuration of the system and the desired transmission characteristics, as is described below in greater detail. The fractional loading factor X may be a percentage or may be another value.

In general, the average capacity in a fractional loading approach can be approximated as:

$$C_{average} = p_0 c_0 + p_1 c_1 + p_2 c_2 + p_3 c_3 \text{ [b/s/Hz]}$$

$$c_i = \log_2(1+\rho_i) \text{ [b/s/Hz]}$$

where $c_i$ is the capacity in a time-frequency resource with i number of transmissions among the neighboring cells. In the following examples of FIGS. 7 and 8, where a given time-frequency resource is shared among three neighboring cells, there can be zero, one, two, or three transmissions in a time-frequency block. The values of $\rho_i$ indicate the SINR experienced with i number of transmissions among the neighboring cells and are approximated as:

$$\rho_0 = 0.0 = -\infty \text{ dB}$$

$$\rho_1 = \frac{R^{-\alpha}}{\frac{3\times(2R)^{-\alpha} + 6\times[(\sqrt{3}+1)R]^{-\alpha}}{3}}$$

$$= \frac{1}{\frac{3\times(2)^{-\alpha} + 6\times(\sqrt{3}+1)^{-\alpha}}{3}}$$

$$= 8.368$$

$$= 9.22 \text{ dB}$$

$$\rho_2 = \frac{R^{-\alpha}}{(R)^{-\alpha} + \frac{3\times(2R)^{-\alpha} + 6\times[(\sqrt{3}+1)R]^{-\alpha}}{3}}$$

$$= \frac{1}{1 + \frac{3\times(2)^{-\alpha} + 6\times(\sqrt{3}+1)^{-\alpha}}{3}}$$

$$= 0.89$$

$$= -0.49 \text{ dB}$$

$$\rho_3 = \frac{R^{-\alpha}}{2\times(R)^{-\alpha} + \frac{3\times(2R)^{-\alpha} + 6\times[(\sqrt{3}+1)R]^{-\alpha}}{3}}$$

$$= \frac{1}{2 + \frac{3\times(2)^{-\alpha} + 6\times(\sqrt{3}+1)^{-\alpha}}{3}}$$

$$= 0.47$$

$$= -3.26 \text{ dB}$$

where R is the cell radius and $\alpha$ is the pathloss exponent.

Figure 6B:
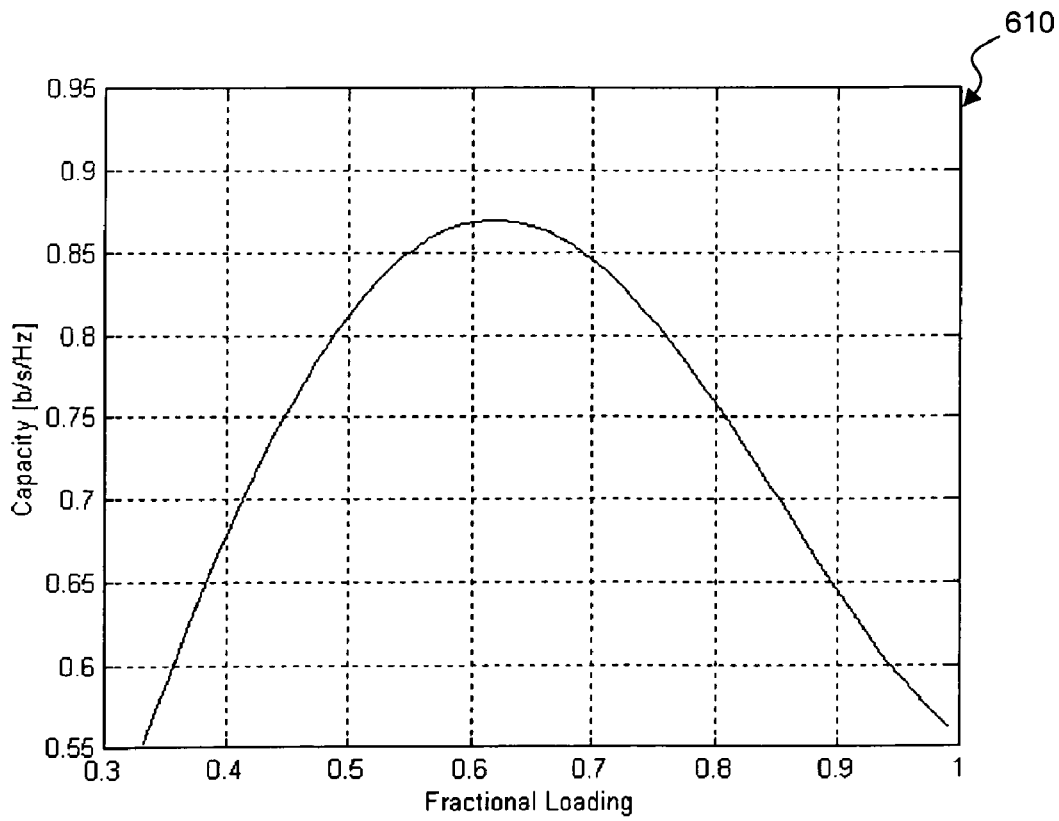
FIG. 6B is a graph of an exemplary curve illustrating the effect of fractional loading on capacity.

With additional reference to FIG. 6B, an example of numerical results for average capacity in a fractional loading approach are illustrated by graph 610 that plots a curve representing fractional loading (x-axis) against capacity in b/s/Hz (y-axis). In the present example, it is noted that the capacity may be maximized at around two-thirds ($\frac{2}{3}^{rds}$) loading, which provides an effective frequency reuse of 3/2=1.5. At lighter loadings, the capacity is lower due to the waste of some time-frequency blocks when none of the neighboring cells are transmitting. At very high loading, the capacity is lower due to increased interference. The fractional loading of one corresponds to a universal frequency reuse case where all the cells transmit in all the time-frequency resources. In the present example, a fractional loading of 0.5-0.75 appears to maximize the achievable capacity.

Referring again to FIG. 6A, after determining the fractional loading factor X in step 602, X resources are selected from a resource pool allocated to single-cell broadcast traffic in step 604. The resources may be selected randomly or may be selected based on predefined criteria. In step 606, users within the cell may be informed of the selected resources for single-cell broadcast traffic via control signaling or another means. As will be described later in greater detail, such notification may not occur in all embodiments as a receiver may identify the resources using other information. In step 608, single-cell broadcast traffic is transmitted using the selected resources.

Figure 7:
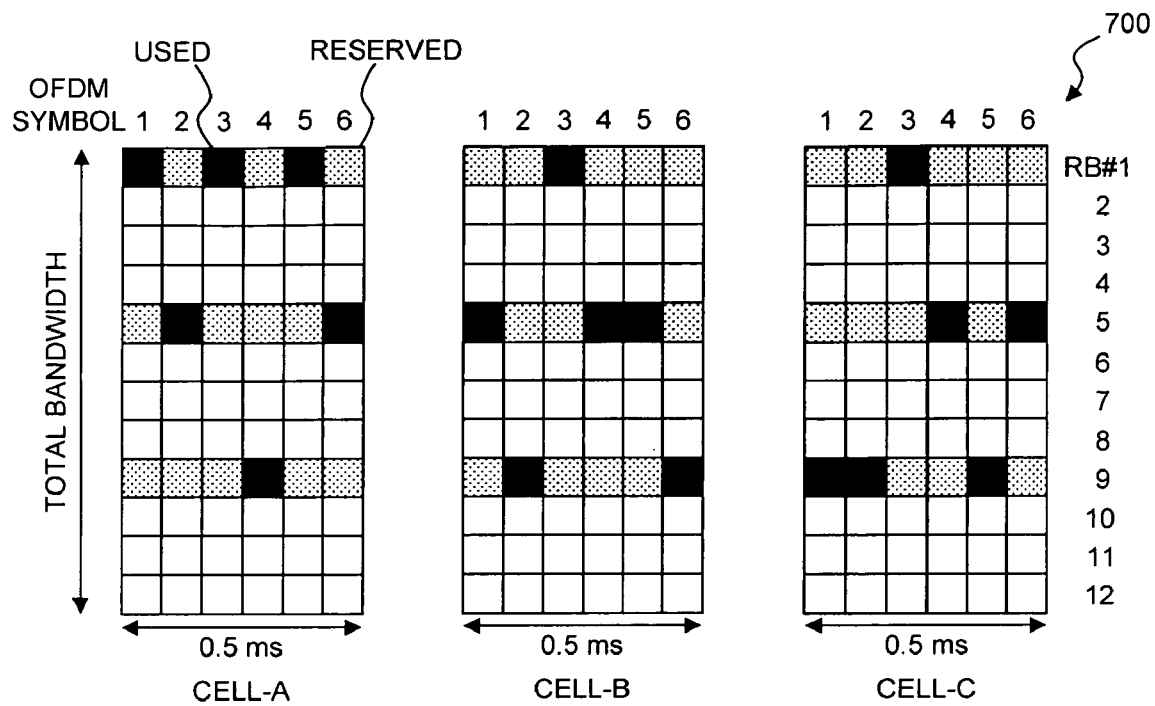
FIG. 7 illustrates one embodiment of a fractional loading approach.

Referring to FIG. 7, one embodiment of a flexible fractional loading approach 700 is illustrated. For purposes of example, Cell-A, Cell-B, and Cell-C of FIG. 3 are used. In this embodiment of the fractional loading approach, each cell Cell-A, Cell-B, and Cell-C operates at a duty cycle smaller than one hundred percent of a given time-frequency resource. In the example of FIG. 7, one quarter (¼$^{th}$) of the frequency resource (i.e., three out of twelve total resource blocks RB#1-12) in a given subframe is reserved for supporting single-cell broadcast/multicast, and each cell operates at a fractional loading of one third (⅓$^{rd}$) on this reserved frequency resource (e.g., six out of eighteen time-frequency blocks). For purposes of illustration, the reserved frequency resources include RB1, 5, and 9 and are indicated by shaded boxes, while each cell's used time-frequency blocks are denoted by black boxes.

The selection of time-frequency blocks in a given cell can be based on a pseudo-random cell-specific sequence that is pre-known at a mobile terminal. In FIG. 7, it is assumed that there is Resource-Block (RB) based distributed resource allocation for single-cell broadcast/multicast. In the present example, a resource block is a logical representation of a set of contiguous or distributed subcarriers within a subframe. It is also possible to allocate a localized resource and single-cell broadcast/multicast transmissions operating at a fractional loading. The fractional loading approach does not need coordination between Cell-A, Cell-B, and Cell-C and so, in some cases, the transmissions from neighboring cells can overlap.

For overlap to occur between cells, a cell's OFDM symbol must be transmitted using the same RB/time-frequency block as the transmission of another cell. In the example of FIG. 7, Cell-B's transmission does not overlap with the neighboring Cell-A and Cell-C in OFDM symbols 1, 5 and 6. In OFDM symbols 2 and 4, Cell-B's transmission overlaps with one neighboring cell (Cell-C), while transmission of OFDM symbol 3 overlaps with both Cell-A and Cell-C. Accordingly, Cell-B will see the highest SINR in OFDM symbols 1, 5, and 6, a lower SINR in OFDM symbols 2 and 4, and an even lower SINR in OFDM symbol 3. In general, a fractional loading approach can provide an overall gain in system capacity if the reduction in interference produced by the fractional loading results in greater capacity than is lost due to the reduced bandwidth. It should be noted that when the resource reserved for single-cell broadcast/multicast is not used in certain cells, the same resource can be used for unicast traffic or control information with transmission at a reduced duty-cycle.

Figure 8:
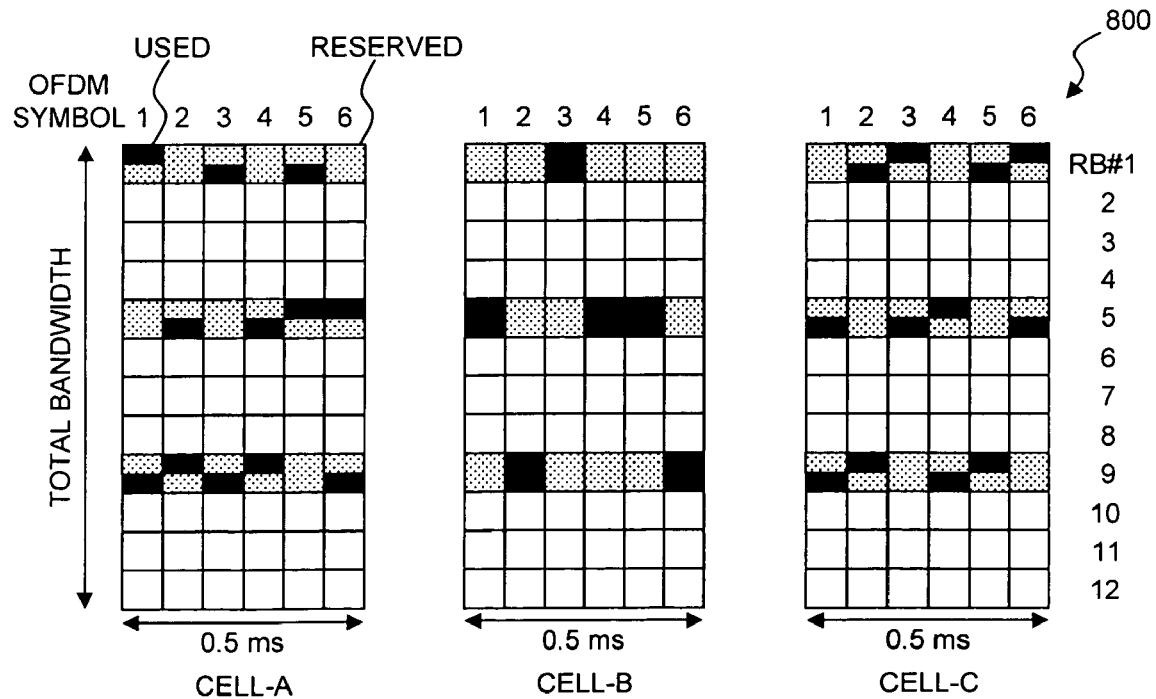
FIG. 8 illustrates another embodiment of a fractional loading approach.

Referring to FIG. 8, another embodiment of a flexible fractional loading approach 800 is illustrated where the fractional loading is achieved by using a part of the resource block in at least some cells. For purposes of example, Cell-A, Cell-B, and Cell-C of FIG. 3 are used. For example, Cell-A and Cell-C may utilize fifty percent of the frequency resource of the resource block in order to achieve fractional loading. This results in the use of more blocks by Cell-A and Cell-C than the example of FIG. 7, but only half of a block's resources are used. Cell-B uses all the frequency resource within a resource block (as in FIG. 7) and fractional loading is achieved by Cell-B leaving all of the frequency resource in some resource blocks free.

Figure 9:
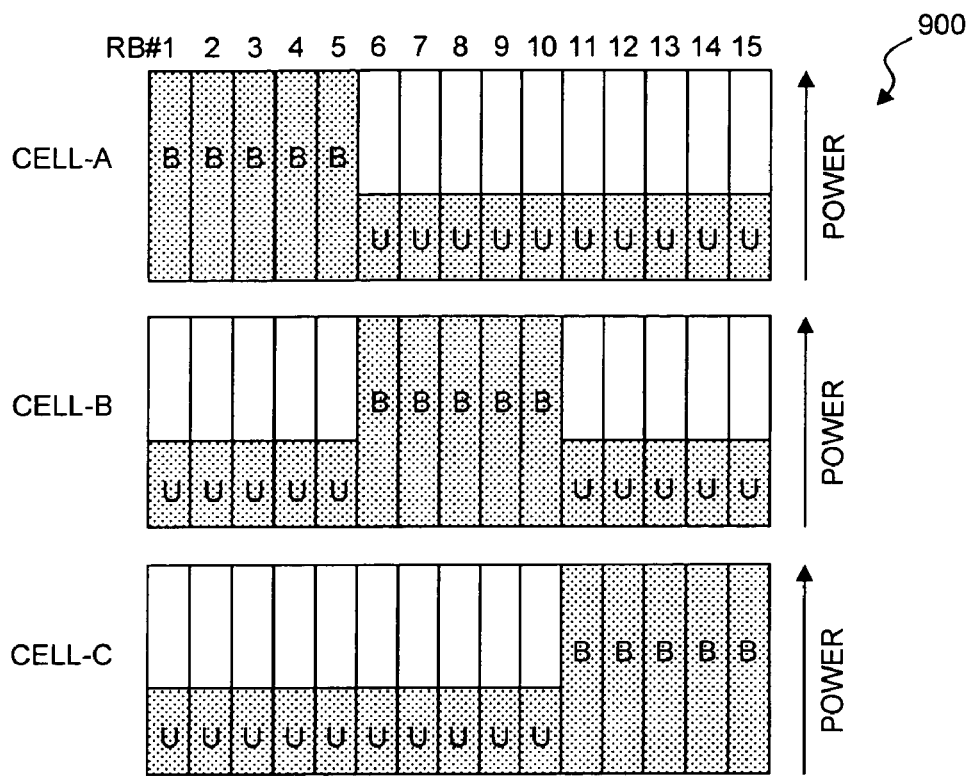
FIG. 9 illustrates an embodiment of a fractional loading approach that enables a cell to use a portion of another cell's resources at a lower power level.

Referring to FIG. 9, in yet another embodiment, an approach 900 illustrates how resources reserved for broadcast/multicast in a given cell can be used in neighboring cells for unicast traffic at a lower transmit power. For purposes of example, Cell-A, Cell-B, and Cell-C of FIG. 3 are used. In the example of FIG. 9, resource blocks 1-5 are reserved for single-cell broadcast/multicast (denoted by "B") in Cell-A, resource blocks 6-10 are reserved for single-cell broadcast/multicast in Cell-B, and resource blocks 11-15 are reserved for single-cell broadcast/multicast in Cell-C. In the present embodiment, resource blocks 6-15 can be used for unicast traffic (denoted by "U") in Cell-A, resource blocks 1-5 and 11-15 can be used for unicast traffic in Cell-B and resource blocks 1-10 can be used for unicast traffic in Cell-C. As illustrated in FIG. 9, a unicast transmission in neighboring cells on the broadcast resource may occur at a lower power than a broadcast transmission. In some embodiments, it is possible to only schedule unicast users closer to the cell at a lower transmit power on the resources reserved for broadcast. This may help in assuring that minimal interference is created to the broadcast traffic from the unicast traffic transmissions.

Figure 10:
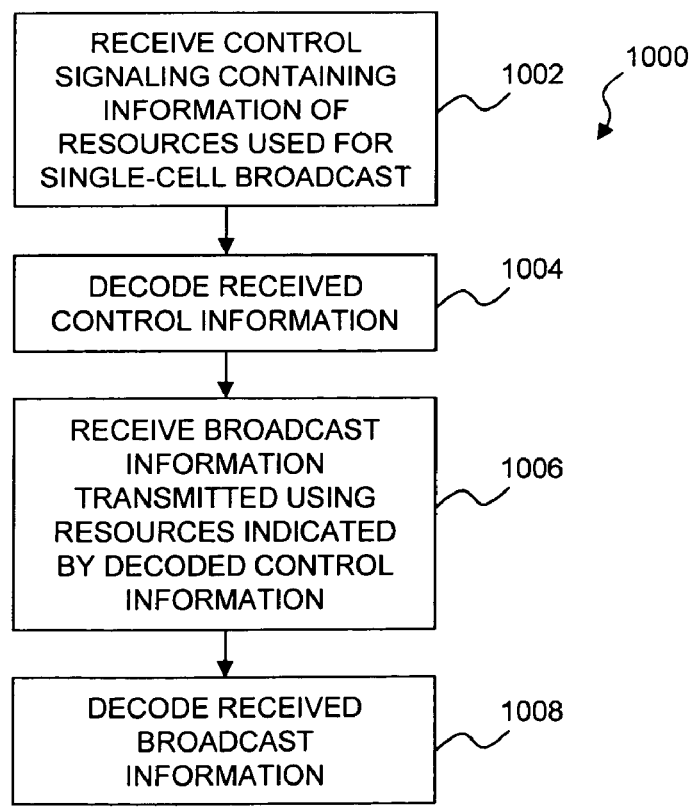
FIG. 10 is a flowchart illustrating one embodiment of a method for use by a receiver in a wireless system that uses fractional loading.

Referring to FIG. 10, in another embodiment, a method 1000 may be used by a receiver (e.g., in a wireless terminal) to detect and handle information sent by a transmitter using a fractional loading process, such as that described with respect to the method 600 of FIG. 6. In the present example, the transmitter uses control signaling to inform the receiver of the resources used for the fractional loading based transmission. In step 1002, control signaling is received from the transmitter that contains information regarding the resources used for single-cell broadcast and, in step 1004, the receiver decodes the received control signal(s). In steps 1006 and 1008, the receiver receives and decodes broadcast information that was transmitted using the resources identified in the decoded control information.

Figure 11:
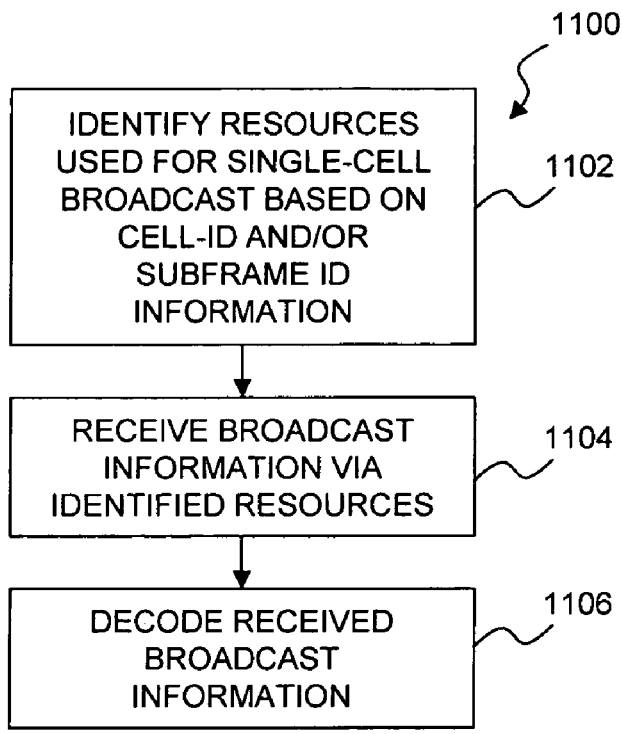
FIG. 11 is a flowchart illustrating another embodiment of a method for use by a receiver in a wireless system that uses fractional loading.

Referring to FIG. 11, in another embodiment, a method 1100 may be used by a receiver (e.g., in a wireless terminal) to detect and handle information sent using a fractional loading process, such as that described with respect to the method 600 of FIG. 6. In the present example, the base station does not need to transmit any explicit control signaling information about the resources used for single-cell broadcast/multicast. Instead, the receiver determines this information implicitly based on, for example, the cell-ID and/or the subframe ID. As neighboring cells generally have different IDs, this approach may ensure that different resources are used for single-cell broadcast/multicast in different cells at a given time, thereby reducing inter-cell interference. Accordingly, in step 1102, the receiver identifies the resources being used for single-cell broadcast based on cell ID and/or subframe ID information. In steps 1104 and 1106, the receiver receives and decodes broadcast information that was transmitted using the resources identified in step 1102.

Figure 12:
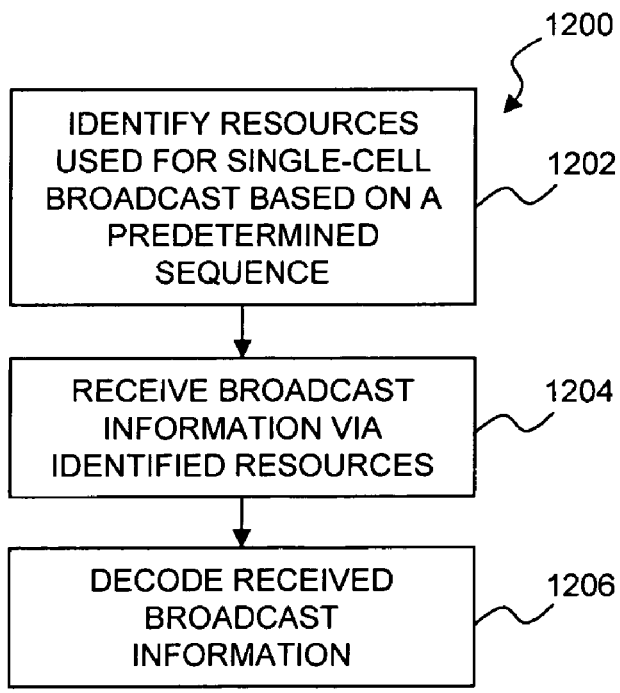
FIG. 12 is a flowchart illustrating yet another embodiment of a method for use by a receiver in a wireless system that uses fractional loading.

Referring to FIG. 12, in another embodiment, a method 1200 may be used by a receiver (e.g., in a wireless terminal) to detect and handle information sent using a fractional loading process, such as that described with respect to the method 600 of FIG. 6. In the present example, the receiver uses a predetermined sequence to identify the resources used for the fractional loading transmission. In step 1202, the receiver identifies the resources being used for single-cell broadcast based on a predetermined sequence. The sequence may be coupled to, for example, cell ID information or may be communicated to the receiver at connection setup. In some embodiments, different base stations may use different sequences to minimize the probability of resource transmission collision between neighboring cells. In steps 1204 and 1206, the receiver receives and decodes broadcast information that was transmitted using the resources identified by the predetermined sequence.

Although only a few exemplary embodiments of this disclosure have been described in detail above, those skilled in the art will readily appreciate that many modifications are possible in the exemplary embodiments without materially departing from the novel teachings and advantages of this disclosure. For example, various features described herein may be implemented in hardware, software, or a combination thereof. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
   determining, by a base station, a fractional loading factor using a duty cycle of a base station, wherein the fractional loading factor is used for transmitting single-cell broadcast traffic in a wireless network, and wherein the fractional loading factor is based upon a percentage of resources from a resource pool allocated to single-cell broadcast traffic;
   transmitting single-cell broadcast traffic using the fractional loading factor resources, wherein the fractional loading factor enables the base station to identify resources used for the single-cell broadcast based upon a cell-ID of the broadcast traffic, wherein the fractional loading factor uses an average capacity value obtained as a function of a wireless capacity in a time-frequency resource using a number of transmissions among neighboring cells; and
   transmitting unicast traffic using non-selected resources from the resource pool, wherein transmitting further comprises transmitting at least a portion of the unicast traffic at a reduced transmit power.

2. The method of claim 1 further comprising notifying at least one mobile terminal of the resources selected for use for single-cell broadcast.

3. The method of claim 2 wherein notifying the at least one mobile terminal includes sending information about the resources to the mobile terminal via a control signaling channel.

4. The method of claim 2 wherein notifying the at least one mobile terminal includes sending a predetermined sequence to the mobile terminal when the mobile terminal connects to the base station.

5. The method of claim 1 wherein the resources are randomly selected.

6. A method comprising:
   determining, by a base station, a fractional loading factor for a portion of a wireless network, wherein the fractional loading factor is based upon a capacity in a time-frequency resource;
   randomly selecting, by the base station, wireless network resources from a resource pool allocated to single-cell broadcast traffic based on the fractional loading factor;
   informing, by the base station, at least one mobile terminal of the wireless network resources selected for use for single-cell broadcast; and
   transmitting, by a base station, single-cell broadcast traffic using the wireless network resources; and
   transmitting unicast traffic using non-selected resources from the resource pool, wherein transmitting further comprises transmitting at least a portion of the unicast traffic at a reduced transmit power.

7. The method of claim 6 wherein the fractional loading factor corresponds to a percentage of the resource pool.

8. The method of claim 6 wherein the fractional loading factor is a value between approximately 0.50 and 0.75.

9. The method of claim 6 wherein the wireless network resources are grouped in resource blocks within the resource pool, and wherein selecting wireless network resources includes selecting at least one resource block.

10. The method of claim 6 wherein informing at least one mobile terminal includes sending information about the wireless network resources to the mobile terminal via control signaling.

11. The method of claim 6 wherein informing at least one mobile terminal includes sending a predetermined sequence to the mobile terminal.

12. A method comprising:
    receiving, by a wireless receiver, information about single-cell broadcast resources used for fractional loading transmissions in a cell of a wireless network by a base station, the single-cell broadcast resources comprising a percentage of resources from a resource pool allocated to single-cell broadcast traffic;
    decoding the received single-cell broadcast resource information;
    receiving, by the wireless receiver, broadcast information transmitted by the base station using the single-cell broadcast resources;
    decoding the received broadcast information, wherein the decoding uses either a sub-frame identification of the broadcast resource or a cell-ID of the base station from the received single-cell broadcast resource information; and
    receiving, by the wireless receiver, unicast traffic using non-selected resources from the resource pool, wherein at least a portion of the unicast traffic is received at a reduced transmit power.

13. The method of claim 12 wherein the information about single-cell broadcast resources is received via control signaling information.

14. The method of claim 12 further comprising identifying the information about single-cell broadcast resources based on a predetermined sequence.

15. The method of claim 14 wherein the predetermined sequence is coupled to a cell identifier.

16. The method of claim 14 wherein the predetermined sequence is received by the wireless receiver when the wireless receiver connects to the base station.

17. A method comprising:
    identifying, by a wireless receiver, information about single-cell broadcast resources used for fractional loading transmissions in a cell of a wireless network based on at least one of a cell identifier and a subframe identifier, the single-cell broadcast resources comprising a percentage of resources from a resource pool allocated to single-cell broadcast traffic;
    receiving, by the wireless receiver, broadcast information transmitted by a base station using the single-cell broadcast resources;
    decoding the received broadcast information, wherein the decoding uses either the sub-frame identifier of the broadcast resource or a cell-ID of the base station; and
    receiving, by the wireless receiver, unicast traffic using non-selected resources from the resource pool, wherein at least a portion of the unicast traffic is received at a reduced transmit power.

18. A base station in a wireless network comprising:
    a wireless interface configured to receive and transmit wireless signals;
    a processor coupled to the wireless interface;
    a memory coupled to the processor; and
    a plurality of executable instructions stored on the memory for execution by the processor, the instructions including instructions for:
    determining a fractional loading factor for a cell in which the base station is positioned;

selecting wireless network resources corresponding to the fractional loading factor from a resource pool allocated to single-cell broadcast traffic;

selecting a subframe or a cell-id to transmit the single-cell broadcast traffic, the subframe or the cell-id used to identify the single-cell broadcast traffic;

transmitting single-cell broadcast traffic using the wireless network resources; and transmitting unicast traffic using non-selected resources from the resource pool, wherein at least a portion of the unicast traffic is received at a reduced transmit power.

19. The base station of claim 18 wherein the fractional loading factor corresponds to a percentage of the resource pool.

20. The base station of claim 18 wherein the instructions for selecting the wireless network resources include instructions for randomizing the selecting.

21. The base station of claim 18 further comprising instructions for informing at least one mobile terminal in the cell of the wireless network resources selected for use for single-cell broadcast.

22. The base station of claim 21 wherein the instructions for informing the at least one mobile terminal include instructions for sending information about the wireless network resources to the mobile terminal via control signaling.

23. The base station of claim 21 wherein the instructions for informing the at least one mobile terminal include instructions for sending a predetermined sequence to the mobile terminal when the mobile terminal connects to the base station.

24. The base station of claim 18 wherein the base station is an Orthogonal Frequency Division Multiplexing (OFDM) system.

* * * * *